Patented Aug. 8, 1933

1,921,717

UNITED STATES PATENT OFFICE 1,921,717

METHOD OF MAKING DICHLOROACETIC ACID

Forest C. Amstutz, Midland, Mich., assignor to The Dow Chemical Company, Midland, Mich., a Corporation of Michigan No Drawing. Application September 4, 1930
Serial No. 479,787

12 Claims. (Cl. 260—113)

The present invention relates to the manufacture of chloroacetic acids and more particularly of dichloroacetic acid.

At the present time, dichloroacetic acid is usually obtained as a by-product from processes for the manufacture of monochloroacetic acid, as, for instance, by chlorinating hot glacial acetic acid in the presence of iodine, sulphur chloride, sulphur, phosphorus or other chlorine carrier or catalyst. After crystallizing out monochloroacetic acid from the above mentioned chlorinated acid mixture, the mother liquor residue, which is usually made up of 40 to 50 per cent of dissolved monocholoroacetic acid, 40 to 50 per cent of dichloroacetic acid and the remainder largely a mixture of acetic acid and trichloroacetic acid in varying proportions, provides a convenient source for obtaining dichloroacetic acid. But the usual methods for separating mixtures of this type have proven unsatisfactory because, apparently, of the close proximity of the boiling points and the relative instability of the several components thereof when such mixture is heated or otherwise treated. The recovery of dichloroacetic acid from the chlorinated liquor, by present methods, rarely exceeds fifteen per cent of that theoretically possible. The dichloroacetic acid thus recovered also is of low purity.

The present improved method has as its object the obtaining of a satisfactory yield of dichloroacetic acid of high purity from the above-mentioned mother liquor from the manufacture of monochloroacetic acid. To the accomplishment of the foregoing and related ends, the invention, then, consists of the method hereinafter fully described and particularly pointed out in the claims, the following description setting forth in detail one mode of carrying out the invention, such disclosed mode illustrating, however, but one of several ways in which the principle of the invention may be used.

As previously indicated, in carrying out my invention I may use a chlorinated acetic acid mother liquor from which monochloroacetic acid has been crystallized. This mother liquor, although the monochloroacetic acid had been crystallized therefrom at a low temperature, still contains a great amount of that constituent and may also contain a considerable quantity of the chlorine carrier. I have found that by further chlorinating this mother liquor at a temperature between approximately 140° and 190° C., until a specific gravity of about 1.58 is reached, it is converted to a mixture which contains practically equivalent amounts of the dichloro- and trichloro- acids and a very small amount of the monochloro-acid, while unreacted acetic acid is entirely absent. I have further found that such a mixture of dichloroacetic and trichloroacetic acids may be readily separated by converting the trichloroacetic acid to chloroform and carbon dioxide, the dichloroacetic acid meanwhile being substantially unreacted. By diluting the above mixture with water and then heating at a temperature not to exceed 100° C. for twenty-four to forty-eight hours, the trichloroacetic acid is completely hydrolyzed. The chloroform and carbon dioxide thus obtained may be conveniently passed through a condenser and the former compound recovered, if desired.

The residue from the above step, consisting substantially of a mixture of water, dichloroacetic acid and small amounts of monochloroacetic acid, is now cooled and extracted with an organic solvent such as ether, which forms an immiscible layer, and is separated from the aqueous solution in the usual way. This ether layer, which contains most of the dichoroacetic acid dissolved therein, is now distilled first to remove the ether and upon further distillation the fraction boiling between 190° and 195° C. consists of dichloroacetic acid of 85 to 95 per cent of purity. The recovery of dichloroacetic acid from the above mentioned aqueous solution thereof, from which said acid is extracted with ether, is generally between 60 and 75 per cent of the theoretical.

As extracting liquids other solvent materials than ether may be employed. However, the dichloroacetic acid extracted with the latter solvent contains less moisture and is therefore preferable to use. Other solvents such as ethyl acetate, isopropyl acetate, butyl acetate, isopropyl ether, etc. or mixtures of the same may be advantageously employed also for the purpose. In general the solvents useful for the purpose are included in the group consisting of aliphatic ethers and esters. The presence of small amounts of alcohol or other similar impurities in the ether or equivalent solvent appears to have no detrimental effect upon its use as an extracting means for separating dichloroacetic acid in the present process.

A glass or enamel ware apparatus is preferable for carrying out the chlorinating step of my process. The heating or cooling therein of the liquors, etc., may be accomplished by coils of similar materials or otherwise. In the steps, however, wherein lower temperatures are employed, the reaction vessels may be of a ceramic material, or even non-ferrous alloys or metals may be found advantageous to use.

The following example illustrates a preferred mode of carrying out my invention:—

50 pounds of chloroacetic acid mother liquor of composition approximately 40 per cent monochloroacetic acid, 50 per cent dichloroacetic acid, 9 per cent acetic acid and one per cent sulphur chloride, was introduced into an enamel lined chlorinator and heated to a temperature of from 160° to 185° C. with the introduction of chlorine until a specific gravity of about 1.57 to 1.58 was reached. At this point the composition of the chlorinated mother liquor by analysis was approximately 10 per cent monochloroacetic acid, 50 per cent dichloroacetic acid, and 40 per cent trichloroacetic acid. This chlorinated mother liquor was now transferred to a vessel similar to that used above and equipped with a condenser, diluted with water to about four times its original volume and the temperature thereof maintained at between 85° and 90° C. for forty-eight hours, when a test of the diluted mother liquor by the familiar carbylamine reaction test for trichloroacetic showed the complete absence thereof. Dichloroacetic acid and monochloroacetic acid were found to be present in the diluted mother liquor in the ratio of approximately 9 to 1. This diluted mother liquor was then well cooled and extracted twice with ether, using 10 pounds for each extraction. The combined ether extracts contained approximately 95 per cent of the dichloroacetic acid present in the diluted mother liquor. Upon redistilling, the fraction between 190° and 196° C. consisted of a dichloroacetic acid product approximately 91 per cent pure, the remainder being mostly monochloroacetic acid. The yield of dichloroacetic acid amounted to 72 per cent of the quantity thereof contained in the original mother liquor.

The point at which the chlorination of the acetic acid mother liquor is preferably stopped, e. g. at specific gravity 1.58, at temperatures between about 140° and 190° C., represents the approximate point at which the ratio of dichloroacetic acid to the mono- and tri-chloroacetic acids therein is at a maximum. These percentages of the three acids are substantially those stated above in the example. It is evident that this gravity may vary somewhat if larger amounts of impurities are present or if the composition of the original mother liquor is otherwise changed. That substantially favorable ratios of the mono-, di- and tri-chloroacetic acids in the chlorinated acetic acid mother liquor may be obtained at gravity points somewhat higher or lower than that specified, is also evident.

In the foregoing special reference has been made by way of illustration to the use of the chlorinated mother liquor from the monochloroacetic acid process as a raw material for carrying out my improved process for making dichloroacetic acid. It is understood that I do not so limit myself, but include as well other convenient and adaptable materials or mixtures of compounds that may be suited to such use. It is also understood that I may chlorinate acetic acid or a solution containing acetic acid to form a mixture consisting substantially of dichloroacetic and trichloroacetic acids without introducing an intermediate step for the removal of monochloroacetic acid, and then separate the dichloroacetic acid as hereinbefore described.

Other modes of applying the principle of my invention may be employed instead of the one explained, change being made as regards the method herein disclosed, provided the steps stated by any of the following claims or the equivalent of such steps be employed.

I therefore particularly point out and distinctly claim as my invention:—

1. In a method of making dichloroacetic acid, the steps which consist in reacting acetic acid with chlorine to form a mixture consisting chiefly of dichloroacetic and trichloroacetic acids, hydrolyzing the latter by heating with water, expelling the products of hydrolysis therefrom, and extracting the dichloroacetic acid from the resultant aqueous solution with a solvent immiscible with water.

2. In a method of making dichloroacetic acid, the steps which consist in reacting acetic acid with chlorine to form a mixture consisting chiefly of dichloroacetic and trichloroacetic acids, hydrolyzing the latter by heating with water, expelling the products of hydrolysis therefrom, and extracting the dichloroacetic acid from the resultant aqueous solution with a solvent included in the group consisting of the aliphatic ethers and esters.

3. In a method of making dichloroacetic acid, the steps which consist in reacting acetic acid with chlorine to form a mixture consisting chiefly of dichloroacetic and trichloroacetic acids, hydrolyzing the latter by heating with water, expelling the products of hydrolysis therefrom, and extracting the dichloroacetic acid from the resultant aqueous solution with ethyl ether.

4. The method of making dichloroacetic acid which comprises reacting a chlorinated acetic acid mother liquor with chlorine at temperatures between approximately 140° and 190° C. to convert the monochloroacetic acid thereof substantially to dichloroacetic and trichloroacetic acids, diluting said mother liquor with water, heating the resultant aqueous mother liquor solution at a temperature not to exceed 100° C. to convert the trichloroacetic acid of said mother liquor substantially to chloroform and carbon dioxide, expelling the latter two compounds, cooling said mother liquor, extracting the dichloroacetic acid contained therein by dissolving in ethyl ether, separating out the ethyl ether layer and redistilling the same to recover dichloroacetic acid therefrom.

5. A method of making dichloroacetic acid which comprises chlorinating acetic acid at a temperature between approximately 140° and 190° C. to form a mixture consisting substantially of dichloroacetic and trichloroacetic acids, diluting said acid mixture with water, heating the resultant aqueous acid mixture at a temperature not to exceed 100° C. to hydrolyze the trichloroacetic acid thereof substantially to chloroform and carbon dioxide and to remove the latter two substances, cooling the residue remaining and extracting the dichloroacetic acid therefrom with a solvent immiscible with water.

6. A method of making dichloroacetic acid which comprises reacting acetic acid with chlorine at a temperature between approximately 140° and 190° C. to form a mixture consisting substantially of dichloroacetic and trichloroacetic acids, diluting the resultant acid mixture with water, heating the resultant aqueous acid mixture at a temperature not to exceed 100° C. to hydrolyze the trichloroacetic acid thereof to form substantially chloroform and carbon dioxide and to remove the latter two substances, cooling the residue remaining and extracting with ethyl ether and distilling the ethyl ether extract to recover dichloroacetic acid therefrom.

7. The method of making dichloroacetic acid which comprises chlorinating acetic acid at a temperature from about 140° to 190° C. until a specific gravity of approximately 1.57 to 1.58 is reached, heating the mixture with water at a reaction temperature not to exceed 100° C. to hydrolyze trichloroacetic acid, and separating dichloroacetic acid from the residual mixture.

8. The method of making dichloroacetic acid which comprises chlorinating acetic acid at a temperature from about 140° to 190° C. until a specific gravity of approximately 1.57 to 1.58 is reached, diluting with water, heating the aqueous solution at a temperature not to exceed 100° C. to hydrolyze the trichloroacetic acid contained therein substantially to chloroform and carbon dioxide and to remove the latter two substances, cooling the residual aqueous solution, extracting with ethyl ether, and distilling the ethyl ether extract to recover the dichloroacetic acid therefrom.

9. The method of making dichloroacetic acid which comprises chlorinating a monochloroacetic acid mother liquor at a temperature from about 140° to 190° C. until a specific gravity of approximately 1.57 to 1.58 is reached, heating the mixture with water at a reaction temperature not to exceed 100° C. to hydrolyze trichloroacetic acid, and separating dichloroacetic acid from the residual mixture.

10. The method of making dichloroacetic acid which comprises chlorinating monochloroacetic acid mother liquor at a temperature from about 140° to 190° C. until a specific gravity of approximately 1.57 to 1.58 is reached, diluting with water, heating the aqueous solution at a temperature not to exceed 100° C. to hydrolyze the trichloracetic acid contained therein substantially to chloroform and carbon dioxide and to remove the latter two substances, cooling the residual aqueous solution, extracting with ethyl ether, and distilling the ethyl ether extract to recover the dichloroacetic acid therefrom.

11. The method of recovering dichloroacetic acid from its admixture with trichloroacetic acid which comprises adding water to such mixture, heating to a temperature below that at which dichloroacetic acid is hydrolyzed to a substantial degree, so as to hydrolyze the trichloroacetic acid, and then extracting the unreacted dichloroacetic acid from the aqueous reaction mixture with ethyl ether.

12. In a method of making dichloroacetic acid, the step which consists in heating a mixture consisting substantially of dichloroacetic and trichloroacetic acids with water to a reaction temperature not to exceed 100° C. whereby trichloroacetic acid is hydrolyzed and dichloroacetic acid remains substantially unreacted.

FOREST C. AMSTUTZ.